Dec. 14, 1937.   J. K. KINNEAR   2,102,237
REEL SEAT FOR FISHING ROD HANDLES
Filed Nov. 30, 1936

INVENTOR
J. Karl Kinnear.
BY
ATTORNEY.

Patented Dec. 14, 1937

2,102,237

UNITED STATES PATENT OFFICE 2,102,237

REEL SEAT FOR FISHING ROD HANDLES

John Karl Kinnear, Geneva, Ohio, assignor to The American Fork & Hoe Company, Cleveland, Ohio, a corporation of Ohio Application November 30, 1936, Serial No. 113,371

6 Claims. (Cl. 43—22)

This invention relates to fishing rod handles and more particularly to a fishing rod handle adapted to receive conventional type reels of varying size and which will securely lock the reel in position on the handle.

It is desirable that a fishing rod handle be adapted to receive reels of varying sizes as dictated by the type rod employed and considered best suited for particular fishing conditions. The conventional reel comprises a reel base including longitudinally extending arcuate portions adapted to be clamped to the reel seat of the handle. A large reel subjected to more rigorous conditions is usually provided with a relatively larger reel base than a smaller reel due to the necessity of maintaining a secure engagement of the reel on the handle. The reel clamping means must therefore accommodate itself to reels of varying size and maintain a secure grip on the reel for each size.

I have provided a fishing rod handle generally similar to that illustrated in a patent to W. B. Zass, 1,534,674 issued April 21, 1925, but having an improved form of reel clamping means adapted to accommodate reels of varying size.

It is an object of my invention therefore to provide a fishing rod handle having improved clamping means adapted to maintain reels of varying size in secure engagement with the reel seat.

Another object of my invention is to provide a fishing rod handle having improved clamping means adapted to accommodate reels of varying size and wherein the clamping means may be easily adjusted to different size reels.

Another object of my invention is to provide an improved fishing rod handle adapted to reels of varying sizes wherein the gripping area of the clamping means is increased in correspondence with an increase in the size of the reel base.

Another object of my invention is to provide a fishing rod handle having detachable clamping means to accommodate reels of varying size.

Another object of my invention is to provide an improved fishing rod handle adapted to accommodate reels of varying size which is economical of manufacture and assembly.

Other objects of my invention and the invention itself will become increasingly apparent from a consideration of the following description and drawing wherein:

Fig. 5 is an end elevational view of the clamp element.

Figure 1:
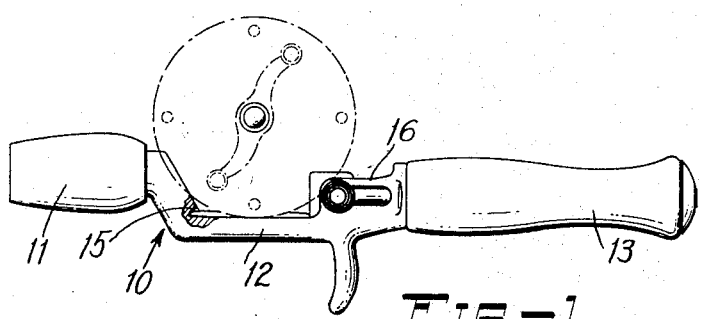
Fig. 1 is an elevational view of a fishing rod handle embodying my invention.

Referring now to the drawing, I have indicated generally at 10 a fishing rod handle preferably formed of light metal such as aluminum including a tubular portion 11 adapted to receive the butt end of a fishing rod, an intermediate reel seat portion 12, and a hand grip portion 13. The portions 11 and 13 are preferably encased in cork or the like to afford a more secure hand grip.

The reel seat 12 comprises a depressed portion upon which the reel base rests having upstanding lateral flanges 14—14 limiting transverse movement of the reel base, and an undercut portion forming a pocket 15 adapted to receive the toe of the reel base. The flanges 14—14 merge rearwardly with upstanding slotted flanges 16—16.

The hand grip portion 13 of the handle is centrally bored for the reception of a compression spring 17 and the stem 18 of a clamp element 19. A plug element 20 threadedly engages the bore and forms an abutment for the spring end convolutions. The clamp element 19 includes an enlarged head 21 transversely perforated for the reception of a pin 22 which is projected through the slotted portions of flanges 16—16. Nuts 23—23 threadedly engage the pin ends to prevent transverse movement and are provided with depressions whereby they may be engaged and rotated by a spanner wrench or the like permitting removal of the pin 22.

Figure 3:
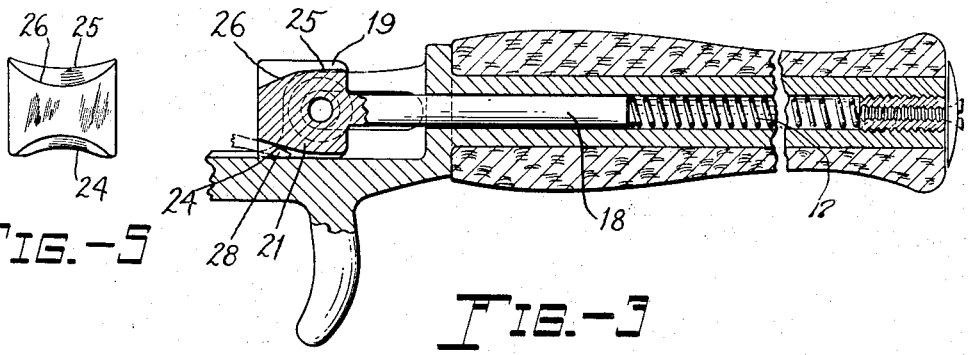
Fig. 3 is a fragmentary sectional view taken along line 3—3 of Fig. 2 and line 3'—3' of Fig. 2.
Figure 4:
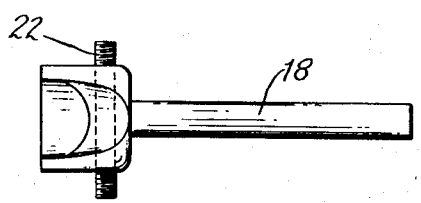
Fig. 4 is a plan view of a clamping element which I may employ.

The head 21 of the clamp element as best illustrated in Figs. 3, 4 and 5 is provided with arcuate surfaces on opposite faces thereof as indicated at 24, 25 and 26, each of said arcuate surfaces having a different radius of curvature with the center disposed forwardly of the clamp element head 21. Surface 24 has the shortest radius of curvature with the surface 25 having a somewhat larger radius of curvature and the surface 26 having the greatest radius of curvature.

Figure 2:
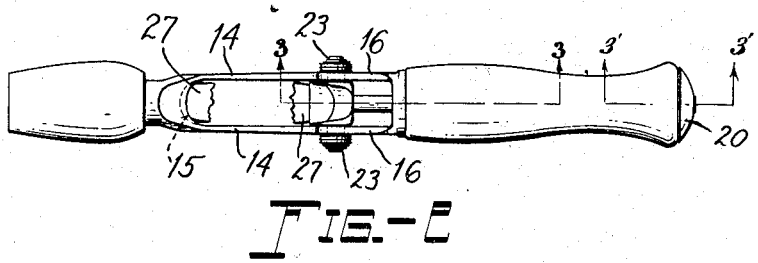
Fig. 2 is a top plan view of the handle of Fig. 1.

The reel base end portions are illustrated in Fig. 2 the reel being seated by projecting reel base toe indicated at 27 within pocket 15 of the reel seat and forcing clamp element 19 rearwardly against the depression of spring 17 to permit the reel base heel indicated at 28 to engage the reel seat and upon release of the clamp element, the spring will force the clamp element forwardly to tightly wedge the reel base toe 21 within pocket 15 and force the clamp element head 21 to ride upon the upwardly concave heel portion 28 of the reel base. It is customary for a smaller reel to have a reel base with a sharper curvature or shorter radius of curvature than a larger reel and for a small reel, the surface 24 would engage the reel base heel and substantially conform to the curvature thereof effecting a tight engagement and preventing any tendency of the reel to rock transversely relative to the handle. When employing a somewhat larger reel and a reel base with a correspondingly greater curvature, the surface 25 will engage the reel base heel. This is effected by removal of pin 22 through dis-engagement of one of the nuts 23 thereby permitting removal of clamp element 19 whereby the clamp element may be rotated to present the surfaces 25 and 26 to the reel base. A still larger reel and correspondingly larger reel base may be accommodated by engagement with surface 26 of clamp element head 21 and, in this instance, the clamp element will be disposed more rearwardly when in locking engagement with the reel base.

Thus, I provide a clamp element having a plurality of surfaces of different curvatures and gripping areas insuring a firm engagement and secure mounting for reels of varying size. The clamp element can be employed with prior art handles such as the aforementioned Zass handle illustrated in Patent No. 1,534,674.

Although I have shown and described a preferred modification of my invention, I contemplate that numerous and extensive departures may be made therefrom without departing from the spirit of my invention and the scope of the appended claims.

Having thus described my invention what I claim is:

1. In a fishing rod handle, a hand grip portion, a reel seat base, a clamp element comprising an enlarged head portion and a hand grip connected portion, said head portion having a plurality of surfaces of different contour adapted to seat therein reels of varying sizes.

2. The combination with a fishing rod handle comprising a tubular hand grip portion having resilient means therein and including a reel seat having a portion adapted to engage the toe of a reel base, of a clamp element engaging the resilient means and having a head portion provided with a plurality of surfaces of different contour, each of said surfaces being adapted to exert forward and downward pressure on a reel base conforming substantially to the contour of such surface, under pressure exerted by the resilient means.

3. The combination with a fishing rod handle comprising a tubular hand grip portion having resilient means therein and including a reel seat having a portion adapted to engage the toe of a reel base, of a clamp element including a stem portion slideably disposed within the hand grip portion and continuously urged in a forward direction by the resilient means, the clamp element also having a head portion providing a plurality of arcuate surfaces of differing contour, each of said surfaces being adapted to engage a reel base of different size to exert pressure forwardly and downwardly thereon under pressure exerted by the resilient means.

4. The combination with a fishing rod handle comprising a tubular hand grip portion having resilient means therein and including a reel seat having a portion adapted to engage the toe of a reel base, of a clamp element adapted to engage the heel of a reel base and exert pressure forwardly and downwardly thereon under pressure exerted by the resilient means, the clamp element including a stem projected within the hand grip portion and engaging the resilient means, and a head portion having a plurality of arcuate surfaces of differing contour, each of said surfaces being adapted to engage a reel base heel of a different size, the head portion being slideably connected to the handle by a transversely extending pin element removable to permit the head portion to be rotated to present a different surface to a reel base.

5. An article of manufacture comprising a clamp element for fishing rod handles adapted to clamp the heel of a reel base on the handle, said rod handle having pressure applying means, the clamp element having a stem insertible within the rod hand grip portion and an enlarged head having arcuate surfaces of different contour on opposite faces thereof, each of said surfaces converging toward a point forwardly of the head whereby each of said surfaces may exert forward and downward pressure on a particular size reel base associated therewith under pressure exerted by said pressure applying means tending to move the clamp element forwardly along the handle.

6. In a fishing rod handle, a tubular hand grip portion, a reel seat base, a clamp element comprising an enlarged head portion and a stem portion, said stem portion adapted to be projected within said tubular hand grip portions, and said enlarged head portion having a plurality of arcuated surfaces.

J. KARL KINNEAR.